(12) United States Patent
Roberts et al.

(10) Patent No.: US 7,843,090 B2
(45) Date of Patent: Nov. 30, 2010

(54) ELECTROMECHANICAL GENERATOR FOR CONVERTING MECHANICAL VIBRATIONAL ENERGY INTO ELECTRICAL ENERGY

(75) Inventors: Stephen Roberts, Winchester (GB); Roy Freeland, Shawford (GB); Neil White, Southampton (GB)

(73) Assignee: Perpetuum Ltd., Southampton (GB)

( * ) Notice: Subject to any disclaimer, the term of this patent is extended or adjusted under 35 U.S.C. 154(b) by 488 days.

(21) Appl. No.: 12/063,658

(22) PCT Filed: Aug. 8, 2006

(86) PCT No.: PCT/GB2006/002953

§ 371 (c)(1),
(2), (4) Date: Feb. 12, 2008

(87) PCT Pub. No.: WO2007/020383

PCT Pub. Date: Feb. 22, 2007

(65) Prior Publication Data

US 2010/0176664 A1 Jul. 15, 2010

(51) Int. Cl.
*H02K 33/00* (2006.01)
(52) U.S. Cl. .............................. 310/25; 310/15; 310/21

(58) Field of Classification Search .................. 310/15, 310/17, 20–21, 25, 29, 32, 37
See application file for complete search history.

(56) References Cited

U.S. PATENT DOCUMENTS

| | | | | |
|---|---|---|---|---|
| 3,312,841 | A * | 4/1967 | Makino ........................ | 310/15 |
| 4,500,827 | A * | 2/1985 | Merritt et al. ................... | 322/3 |
| 4,945,269 | A * | 7/1990 | Kamm ......................... | 310/15 |
| 5,587,615 | A * | 12/1996 | Murray et al. ................. | 310/30 |
| 5,909,068 | A * | 6/1999 | Wakiwaka et al. ............. | 310/15 |
| 6,262,500 | B1 * | 7/2001 | Wakiwaka et al. ............. | 310/15 |
| 6,984,902 | B1 * | 1/2006 | Huang et al. .................. | 310/26 |
| 7,161,254 | B1 * | 1/2007 | Janky et al. .................. | 290/1 R |
| 7,414,325 | B2 * | 8/2008 | Pinkerton ................... | 290/1 R |

* cited by examiner

*Primary Examiner*—Thanh Lam
(74) *Attorney, Agent, or Firm*—Carstens & Cahoon, LLP

(57) ABSTRACT

An electromechanical generator for converting mechanical vibrational energy into electrical energy, the electromechanical generator including a cantilever spring having a fixed end, a free end and a central portion therebetween, a mount for the cantilever spring to which the fixed end is fixed, a mass located at the free end of the cantilever spring, the mass including either a coil or at least one magnet defining a region of magnetic flux, wherein at least one of the fixed end and the free end of the cantilever spring is substantially stiffer than the central portion of the cantilever spring.

20 Claims, 5 Drawing Sheets

ELECTROMECHANICAL GENERATOR FOR CONVERTING MECHANICAL VIBRATIONAL ENERGY INTO ELECTRICAL ENERGY

BACKGROUND OF THE INVENTION

The present invention relates to an electromechanical generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

DESCRIPTION OF THE PRIOR ART

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa. The electromechanical generators are miniaturized. This makes them readily locatable in a variety of positions on or in a host apparatus for providing electrical power for driving single or plural components.

One such known miniature electromechanical generator is illustrated in FIG. 1. The known design for the electromechanical generator 2 has magnets 4, 6 attached to a flexible spring-steel beam 8 adjacent to a fixed copper coil 10 located between the magnets 4, 6. An opening 12 is formed in the beam 8 at a free end 14 thereof and the magnets 4, 6 are located on opposite sides of the opening 12. The coil 10 is disposed in the opening 12, and is mounted on an arm 16 extending upwardly from a base 18. The other end 20 of the beam 8 is fixed to an upright support 22 extending upwardly from the base 18. Each magnet 4, 6 comprises a pair of magnet elements 24, 26, each element 24, 26 being located on a respective upper or lower side of the beam 8, with the two elements 24, 26 of each pair being connected together by a keeper 28 located at a side remote from the coil 10. This creates a region of magnetic flux between the magnets 4, 6 in which the coil 10 is disposed. A cover (not shown) may be fitted to the base 18 in order to enclose and protect the moving elements of the electromechanical generator.

When the electromechanical generator 2 is subjected to vibration in the vertical direction (see FIG. 1) and at a frequency near the resonance frequency of the assembly of the beam 8 and the magnets 4, 6, the beam 8 and magnets 4, 6 carried thereon oscillate relative to the coil 10. This movement results in a changing magnetic flux through the coil 10, and hence an induced voltage along the wire of the coil 10.

The known electromechanical generator 2 requires a sprung beam 8, which acts as a cantilever beam, supporting the vibratable magnet assembly. Such a beam requires a suitable spring material to be provided and for the beam supporting the vibratable magnet assembly to be carefully tuned. This can be difficult to achieve accurately, and the resonance characteristics of the sprung beam can vary over the design lifetime of the electromechanical generator 2.

When forming a mechanical resonator, in particular comprising a cantilever beam, from a thin piece of spring material, special attention must be given to the clamping at its ends. In FIG. 1, the sprung beam 8 must be clamped to the upright support 22, typically by a clamping member 30 fixed to the upright support 22 so that the sprung beam 8 is clamped between the upright support 22 and the clamping member 30. Movement of spring material that is in contact with the material of the clamps will inevitably introduce some friction losses. These losses will be variable depending of the exact nature of the spring and clamp materials, their surface finish, construction and the clamping force.

Furthermore, the magnets 4, 6 which are located on the upper and lower side of the beam 8 are required to be fixed to the sprung beam 8. Such fixing can also introduce some friction losses.

It is generally known by those skilled in the art of micro electrical mechanical systems (MEMS) devices that a high Q-factor is desirable in the resonator system employed in the electromechanical generator. Friction losses are undesirable in a resonator because they lower the Q-factor.

Accordingly, there is still a need to enhance the efficiency of the conversion by an electromechanical generator, in particular a miniature electromechanical generator, of mechanical vibration energy into electrical energy, and thereby into useful electrical power. Most particularly, there is a need to reduce friction losses, which tend to reduce the Q-factor.

There is also a need for an electromechanical generator, in particular a miniature electromechanical generator, which overcomes or obviates the problems of sprung cantilever beams described above.

SUMMARY OF THE INVENTION

The present invention aims to provide to an improved electromechanical generator for converting mechanical vibrational energy into electrical energy which can operate more efficiently than known devices and/or reduces or obviates problems of friction losses using a cantilever sprung beam as a resonant element.

The present invention accordingly provides an electromechanical generator for converting mechanical vibrational energy into electrical energy, the electromechanical generator including a cantilever spring having a fixed end, a free end and a central portion therebetween, a mount for the cantilever spring to which the fixed end is fixed, a mass located at the free end of the cantilever spring, the mass including either a coil or at least one magnet defining a region of magnetic flux, wherein at least one of the fixed end and the free end of the cantilever spring is substantially stiffer than the central portion of the cantilever spring.

Preferably, at least one of the fixed end and the free end of the cantilever spring is at least twice as stiff as the central portion of the cantilever spring.

Preferably, both of the fixed end and the free end of the cantilever spring are at least twice as stiff as the central portion of the cantilever spring.

Preferably, the increase in stiffness at the or each of the fixed end and the free end is achieved by modifying at least one of the cross-sectional shape and the cross-sectional dimensions of the cantilever spring.

Preferably, the cantilever spring and the mount are integral, the integral mount thereby forming the fixed end of the cantilever spring.

Preferably, the cantilever spring and at least a part of the mass are integral, the integral part of the mass thereby forming the free end of the cantilever spring.

Preferably, at least one magnet is located at the free end of the cantilever spring, the at least one magnet defining a region of magnetic flux within a gap, and further comprising a coil received within the gap.

Preferably, the mount comprises a frame of a housing for the electromechanical generator.

Preferably, the frame defines a cavity within which the cantilever spring, the at least one magnet and the support member are located.

The electromechanical generator may further comprise a plate member to which the coil is fitted, and the plate member is fixed to the frame.

The electromechanical generator may further comprise a cover member fitted to the frame and covering the cavity.

The electromechanical generator may further comprise a base member fitted to the frame and covering the cavity.

The electromechanical generator may further comprise a support member for the at least one magnet at the free end of the cantilever spring, the support member being integral with the cantilever spring.

The electromechanical generator may further comprise a magnet holder for holding the at least one magnet, and wherein the magnet holder is fixed to the support member.

Preferably, the magnet holder is fixed to the support member by a screw threaded connector, the screw threaded connector being adjustable thereby to vary the longitudinal position of the holder relative to the cantilever spring and thereby vary the resonant frequency of the electromechanical generator.

Preferably, the screw threaded connector comprises a first head part fitted to one of the holder and the support member and a second barrel part fitted to the other of the holder and the support member, the head part and the barrel part being threadably connected together external thread 73, mating with the threaded hole 66.

Preferably, the holder is mounted to the support member by at least one pin extending from one of the holder and the support member and slidably received in a hole in the other of the holder and the support member.

The present invention is predicated on the finding by the inventor that by stiffening, e.g. by increasing the cross-sectional thickness and/or modifying the cross-sectional shape and thereby the stiffness) of the cantilever spring at at least one end (typically the fixed end) or more preferably both ends, it is possible to reduce any frictional loss due to its flexing at the clamping points. The frictional loss may be sufficiently reduced so that the frictional loss due to its flexing at the clamping points becomes negligible compared with other losses, such as the inherent loss within the spring material. The thickened parts can constitute an integral mount for the fixed end and an integral support for the magnet(s).

The thickened ends of the spring may be extended to provide convenient attachment to other components of the device, if there are any. Hence there may be a one piece spring and frame.

The present invention can provide the advantage that the electromechanical generator has generally lower losses due to friction, and thus a higher Q-factor, compared to the known device where the end of the cantilever beam is clamped, as shown in FIG. 1. In addition, the Q-factor is more repeatable and predictable. Furthermore, by providing an integral mount for the cantilever beam, in particular when the mount forms an integral frame for the housing of the electromechanical generator, the device can have fewer components, and thereby a lower manufacturing cost.

In another aspect the present invention provides an electromechanical generator for converting mechanical vibrational energy into electrical energy, the electromechanical generator including a cantilever spring having a fixed end and a free end, a mount for the cantilever spring to which the fixed end is fixed, a mass located at the free end of the cantilever spring, the mass including either a coil or at least one magnet defining a region of magnetic flux, the mass further including a support member integral with or connected to the cantilever spring, a holder for holding either the coil or the at least one magnet, and a screw threaded connector which fixes the holder to the support member, the screw threaded connector being adjustable thereby to vary the longitudinal position of the holder relative to the cantilever spring and thereby vary the resonant frequency of the electromechanical generator.

This provides a reliable and convenient adjustment mechanism for fine tuning the resonant frequency of the electromechanical generator.

Preferably, screw threaded connector comprises a first head part fitted to one of the holder and the support member and a second barrel part fitted to the other of the holder and the support member, the head part and the barrel part being threadably connected together.

Preferably, the holder is mounted to the support member by at least one pin extending from one of the holder and the support member and slidably received in a hole in the other of the holder and the support member.

BRIEF DESCRIPTION OF THE DRAWINGS

An embodiment of the present invention will now be described by way of example only with reference to the accompanying drawings, in which:

FIGS. 2 and 3 show an electromechanical generator 32 for converting mechanical vibrational energy into electrical energy for use in accordance with an embodiment of the present invention.

DETAILED DESCRIPTION OF THE PREFERRED EMBODIMENTS

Figure 1:
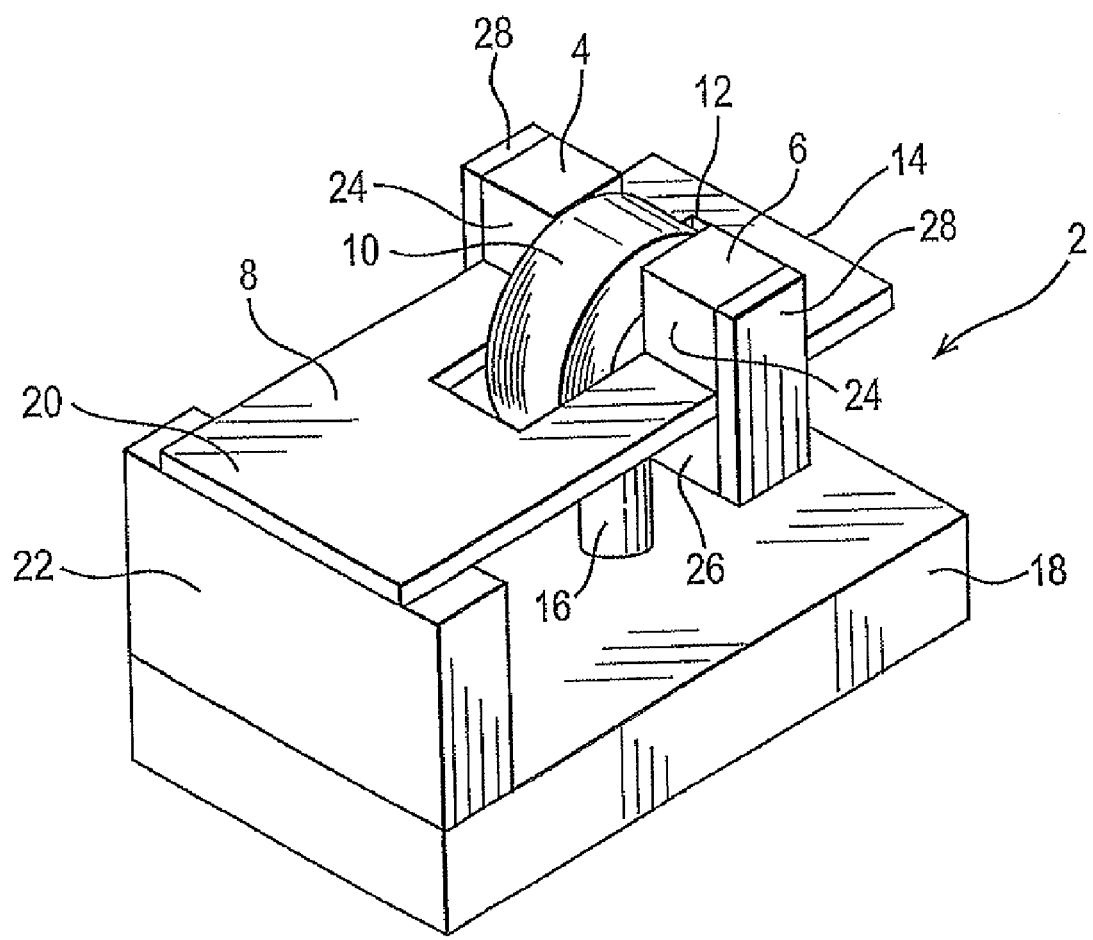
FIG. 1 is a schematic perspective view of a known electromechanical generator for converting mechanical vibrational energy into electrical energy.
Figure 2:
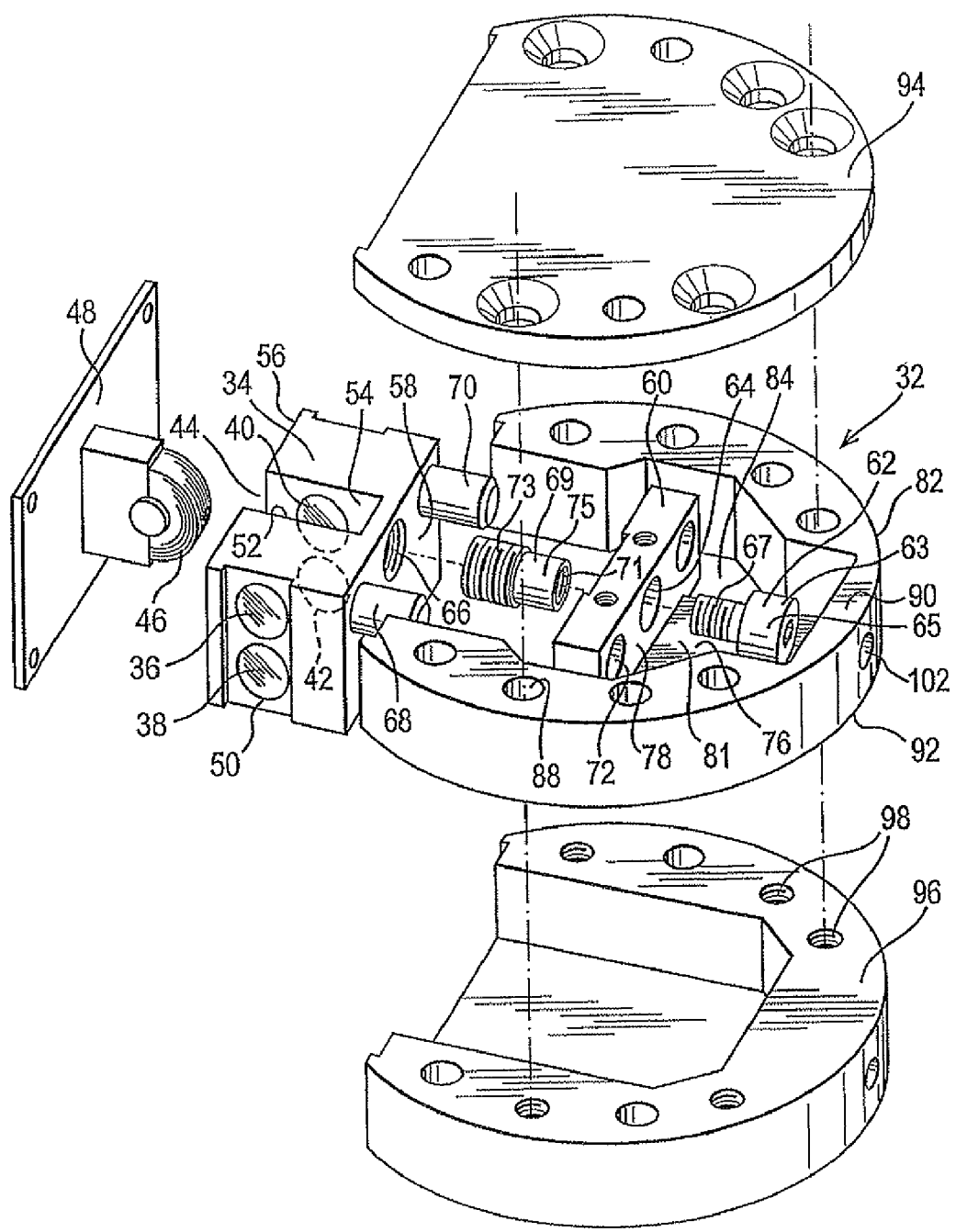
FIG. 2 is a schematic exploded perspective view from above of an electromechanical generator for converting mechanical vibrational energy into electrical energy in accordance with an embodiment of the present invention.

The electromechanical generator 32 comprises a magnet holder 34 which supports a plurality of magnets 36, 38, 40, 42. The magnet holder 34 includes a central gap 44 for receiving therein a coil 46 which is mounted on a face plate 48. The magnet holder 34 is typically rectangular in shape. The magnets 36, 38, 40, 42 are mounted in respective orifices 50 provided in the magnet holder 34 so that faces of the magnets 36, 38, 40, 42 are exposed along opposed sides 52, 54 of the gap 44. In this way, as is well known in the art, a region of magnetic flux is created across the gap 44 by the magnets 36, 38, 40, 42. Up and down vibratory movement of the magnets 36, 38, 40, 42 relative to the static coil 46 within the gap 44 causes the coil 46 to cut the moving magnetic flux. This causes an electrical current to be generated in the coil 46, which is conducted along wires (not shown) to an element (not shown) to be driven by the electrical power harvested from the vibratory motion.

Figure 4:
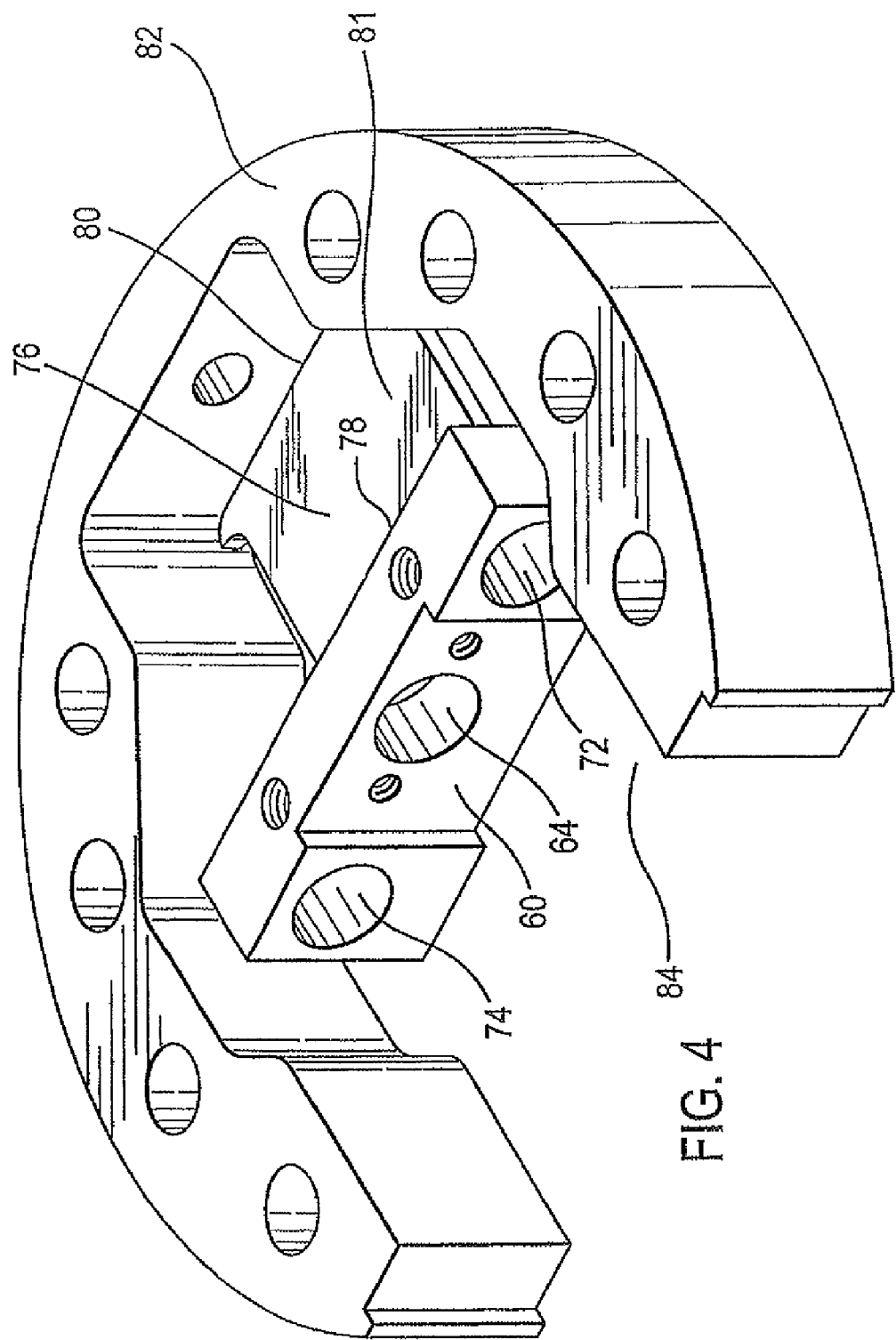
FIG. 4 is a schematic perspective view of an upper surface of the integral cantilever beam and frame of the electromechanical generator of FIG. 2.
Figure 5:
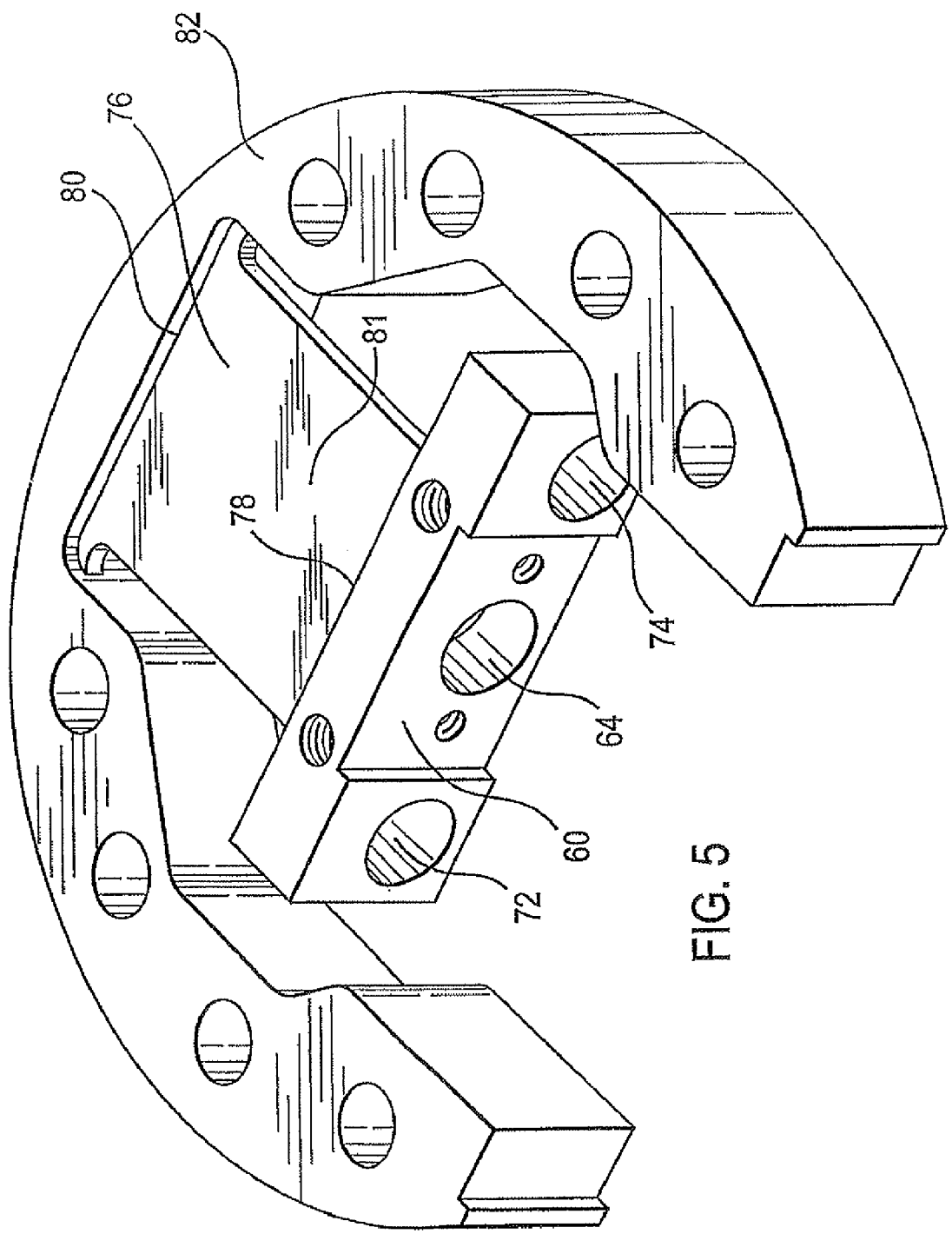
FIG. 5 is a schematic perspective view of a lower surface of the integral cantilever beam and frame of the electromechanical generator of FIG. 2.

The gap 44 is located at a front face 56 of the magnet holder 34. The magnet holder 34 is mounted at a rear face 58 thereof to a support member 60. Referring additionally to FIGS. 4 and 5, the support member 60 is provided with a screw threaded connector 62 which extends through a smooth hole 64 in the support member 60 and is received in a threaded hole 66 provided in the rear face 58 of the magnet holder 34. The screw threaded connector 62 comprises a first head part 63, having a head 65 and a threaded shaft 67, and a second barrel part 69, having an internal thread 71 mating with the threaded shaft 67, and an outer cylindrical surface consisting of an external thread 73, mating with the threaded hole 66, and a smooth barrel 75 received in the smooth hole 64. The threaded shaft 67 is adhered by an adhesive (not shown) within the internal thread 71 so that the first head part 63 and the second barrel part 69 are locked together rotationally and axially. The screw threaded connector 62 is therefore captive on the support member 60, and free to rotate by rotation of the smooth barrel 75 within the smooth hole 64.

The screw threaded connector 62 thereby securely bolts the magnet holder 34 to the support member 60, but in an adjustable manner whereby the spacing therebetween can be varied. Rotation of the head part 63 causes forwards or backwards longitudinal movement of the magnet holder 34 relative to the support member 60, as a result of rotation of the external thread 73 within the threaded hole 66. The magnet holder 34 is pushed away from or pulled towards the support member 60 to vary the location of mass along the length of the cantilever spring/magnet assembly.

The rear face 58 of the magnet holder 34 is also provided with a pair of mutually spaced rearwardly-extending pins 68, 70 which are respectively slidably received within holes 72, 74 provided in the support member 60 on laterally opposite sides of the hole 64 for the screw threaded connector 62. The pins 68, 70 thereby prevent relative rotational movement between the magnet holder 34 and the support member 60. However, they permit forwards or backwards longitudinal movement of the barrel part 69 relative to the head part 63. If desired, only one pin is provided.

The support member 60 is integral with a cantilever spring 76 in the form of a beam, at one end 78 of the cantilever spring 76, the end 78 being free to vibrate in an oscillatory motion, up and down in the drawing, at a resonant frequency determined by the properties of the spring 76 and the mass of the support member 60 and the magnet holder/magnet assembly. In particular, by varying the longitudinal position of the magnet holder 34 at the free end 78 of the cantilever spring 76 by rotating the head part 63, the resonant frequency can readily be finely tuned to a desired value. The cantilever spring 76 is of a thickness and mass such that it vibrates when the electromechanical generator 2 is subject to vibration. At the other end 80 of the cantilever spring 76, the cantilever spring 76 is integral with a frame 82 of the electromechanical generator 2. The frame 82 constitutes a mount for the cantilever spring 76 where the end 80 is in a fixed position.

Accordingly, the cantilever spring 76 has a fixed end 78, a free end 80 and a central portion 81 therebetween. The frame 82 is a mount for the cantilever spring 76 to which the fixed end 78 is fixed. The support member 60 is part of a mass located at the free end 80 of the cantilever spring 76, the mass also including at least one magnet defining a region of magnetic flux. At least one of the fixed end 78 and the free end 80 of the cantilever spring 76 is substantially stiffer, preferably at least twice as stiff, than the central portion 81 of the cantilever spring 76. The increase in stiffness at the or each of the fixed end and the free end is achieved by modifying at least one of the cross-sectional shape and the cross-sectional dimensions of the cantilever spring.

This stiffening is provided in the illustrated embodiment by providing the integral mount 82 and integral support member 60, where the significant increase in thickness of the mount 82 and the support member 60 relative to the central portion 81 of the cantilever spring 76 causes a significant increase in stiffness, so significant that the integral mount 82 and support member 60 do not vibrate at all. However, lower increases in stiffness may still provide reduced friction losses, and even if provided at only one end of the cantilever spring.

In an alternative embodiment, the coil is provided in the mass at the free end of the cantilever spring, with the at least one magnet being fixed.

The frame 82 is part-annular and receives within a central cavity 84 the cantilever spring 76, the support member 60 integral therewith, and the magnet holder 34. At the open end 86 of the frame 82, the face plate 48 is fitted to the frame 82 to provide an annular closed frame construction, with the coil 46 received within the gap 44 at the required position. The face plate 48 is typically fitted to the frame 82 by screws (not shown).

Figure 3:
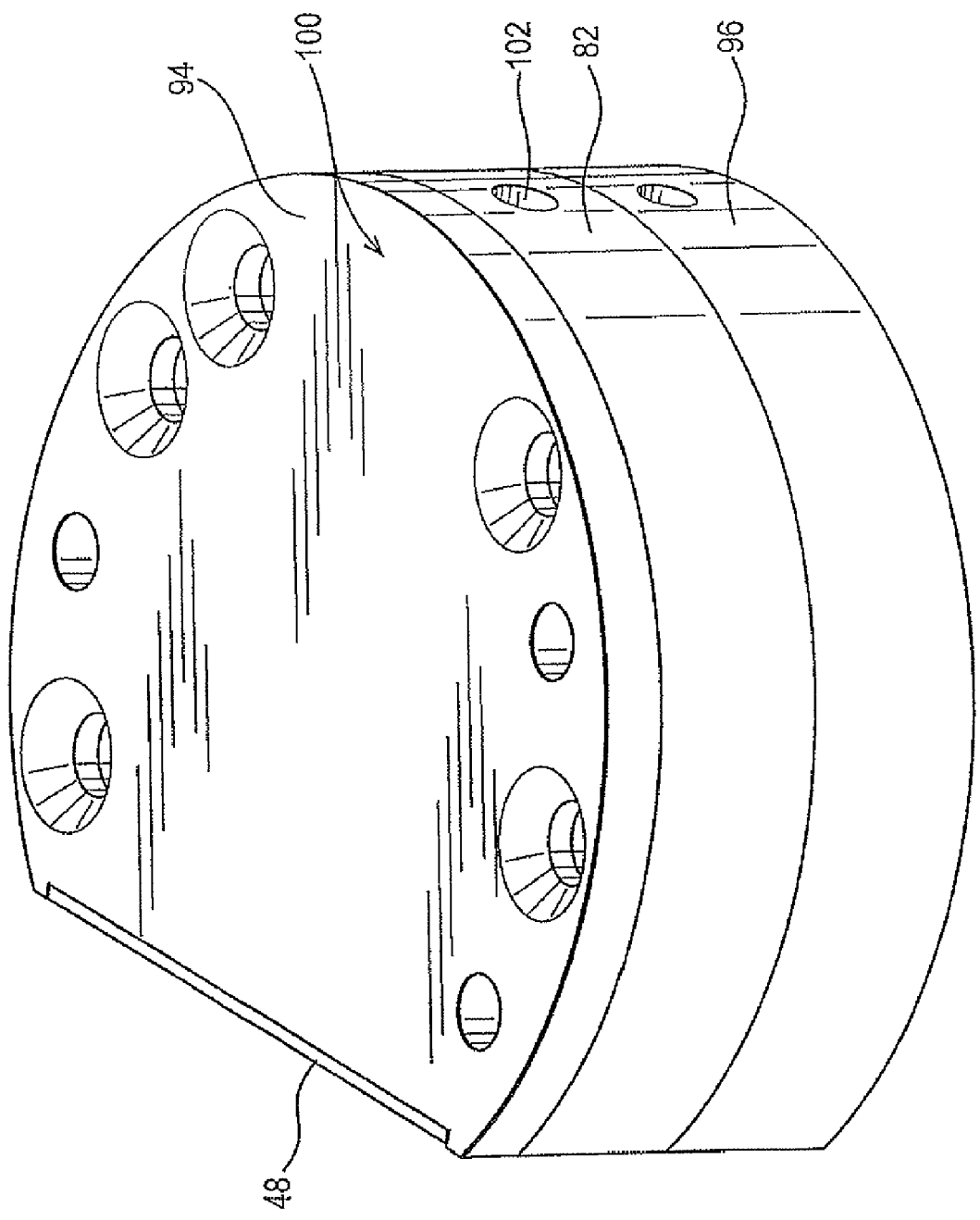
FIG. 3 is a schematic perspective view from above of the electromechanical generator of FIG. 2 in an assembled form.

The frame 82 has a plurality of holes 88 extending therethrough between the upper and lower faces 90, 92. A cover 94 is fitted to the upper face 90 of the frame 82 and a base 96 is fitted to the lower face 92 of the frame 82 by screws (not shown) extending through the cover 94 and the holes 88 in the frame 82 and threaded into screw holes 98 provided in the base 96. The face plate 48 closely fits against the cover 94 and the base 96. This provides a completely closed and secure housing 100 for the electromechanical generator 2, protecting the moving elements. The assembled configuration is shown in FIG. 3. The frame 82 constitutes part of the housing 100.

Referring to FIGS. 4 and 5 it may be seen that the cantilever spring 76 is integrally connected both to the support member 60 and to the frame 82 at a lower edge of both the support member 60 and the frame 82. This permits the screw threaded connector 62 to be substantially centrally located within the support member 60, without making the support member 60 unnecessarily massive. In addition, a mounting hole 102 may be provided in the frame 82 at a location above the respective end 80 of the cantilever spring 76 to enable the electromechanical generator 2 to be securely mounted to a vibrating body from which electrical power is to be harvested.

The support member 60 and the frame 82 are each of a thickness and mass such that they themselves are incapable of vibration when the electromechanical generator is subject to vibration. Only the cantilever spring 76, integral therewith, vibrates. Preferably, the integral support member 60, cantilever spring 76 and frame 82 are made of beryllium copper by conventional rotary milling. The frame is, in one example, about 8 mm thick and, in contrast, the cantilever spring has a thickness about an order of magnitude less, i.e. 0.8 mm thick.

Since the cantilever beam is integral with the frame, and the frame does not itself vibrate when the electromechanical generator is subject to vibration in use, there are no frictional losses between the cantilever beam and the frame, and consequently the cantilever beam and the static parts of the electromechanical generator. In addition, by providing a support for the magnet holder at the other end of the cantilever beam which is integral with the cantilever beam, the support itself vibrating together with the cantilever beam when the electromechanical generator is subject to vibration in use, there are also no frictional losses between the cantilever beam and the magnets at the free end of the cantilever beam.

As compared to the known device described with reference to FIG. 1, frictional losses are reduced. Also, the sprung beam of the known device may tend to have variable spring properties in its useful lifetime, partly as a result of varying frictional losses, which may cause inadvertent variation in the resonant frequency, degrading the power output and/or requiring difficult adjustment of the device. In the electromechanical generator of the present invention, the integral construction of the sprung beam with the frame, and preferably also the magnets, avoids or significantly reduces these frictional losses and so the tuning of the resonant frequency can more readily be accomplished and maintained throughout the device lifetime.

Various modifications to the electromechanical generator of the present invention will be apparent to those skilled in the art. In particular, other shapes may be employed for the frame and the support member and the magnet holder.

The invention claimed is:

1. An electromechanical generator for converting mechanical vibrational energy into electrical energy, the electromechanical generator including a cantilever spring having a fixed end, a free end and a central portion therebetween, a mount for the cantilever spring to which the fixed end is fixed, a mass located at the free end of the cantilever spring, the mass including either a coil or at least one magnet defining a region of magnetic flux, wherein at least one of the fixed end and the free end of the cantilever spring is substantially stiffer than the central portion of the cantilever spring.

2. An electromechanical generator according to claim 1 wherein at least one of the fixed end and the free end of the cantilever spring is at least twice as stiff as the central portion of the cantilever spring.

3. An electromechanical generator according to claim 1 wherein both of the fixed end and the free end of the cantilever spring are at least twice as stiff as the central portion of the cantilever spring.

4. An electromechanical generator according to claim 1 wherein the increase in stiffness at the or each of the fixed end and the free end is achieved by modifying at least one of the cross-sectional shape and the cross-sectional dimensions of the cantilever spring.

5. An electromechanical generator according to claim 1 wherein the cantilever spring and the mount are integral, the integral mount thereby forming the fixed end of the cantilever spring.

6. An electromechanical generator according to claim 1 wherein the cantilever spring and at least a part of the mass are integral, the integral part of the mass thereby forming the free end of the cantilever spring.

7. An electromechanical generator according to claim 1 wherein at least one magnet is located at the free end of the cantilever spring, the at least one magnet defining a region of magnetic flux within a gap, and further comprising a coil received within the gap.

8. An electromechanical generator according to claim 7 wherein the mount comprises a frame of a housing for the electromechanical generator.

9. An electromechanical generator according to claim 8 wherein the frame defines a cavity within which the cantilever spring, the at least one magnet and the support member are located.

10. An electromechanical generator according to claim 9 further comprising a plate member to which the coil is fitted, and the plate member is fixed to the frame.

11. An electromechanical generator according to claim 9 further comprising a cover member fitted to the frame and covering the cavity.

12. An electromechanical generator according to claim 9 further comprising a base member fitted to the frame and covering the cavity.

13. An electromechanical generator according to claim 8 further comprising a support member for the at least one magnet at the free end of the cantilever spring, the support member being integral with the cantilever spring.

14. An electromechanical generator according to claim 13 further comprising a magnet holder for holding the at least one magnet, and wherein the magnet holder is fixed to the support member.

15. An electromechanical generator according to claim 14 wherein the magnet holder is fixed to the support member by a screw threaded connector, the screw threaded connector being adjustable thereby the vary the longitudinal position of the holder relative to the cantilever spring and thereby vary the resonant frequency of the electromechanical generator.

16. An electromechanical generator according to claim 15 wherein screw threaded connector comprises a first head part fitted to one of the holder and the support member and a second barrel part fitted to the other of the holder and the support member, the head part and the barrel part being threadably connected together.

17. An electromechanical generator according to claim 16 wherein the holder is mounted to the support member by at least one pin extending from one of the holder and the support member and slidably received in a hole in the other of the holder and the support member.

18. An electromechanical generator for converting mechanical vibrational energy into electrical energy, the electromechanical generator including a cantilever spring having a fixed end and a free end, a mount for the cantilever spring to which the fixed end is fixed, a mass located at the free end of the cantilever spring, the mass including either a coil or at least one magnet defining a region of magnetic flux, the mass further including a support member integral with or connected to the cantilever spring, a holder for holding either the coil or the at least one magnet, and a screw threaded connector which fixes the holder to the support member, the screw threaded connector being adjustable thereby to vary the longitudinal position of the holder relative to the cantilever spring and thereby vary the resonant frequency of the electromechanical generator.

19. An electromechanical generator according to claim 18 wherein screw threaded connector comprises a first head part fitted to one of the holder and the support member and a second barrel part fitted to the other of the holder and the support member, the head part and the barrel part being threadably connected together.

20. An electromechanical generator according to claim 19 wherein the holder is mounted to the support member by at least one pin extending from one of the holder and the support member and slidably received in a hole in the other of the holder and the support member.

* * * * *